United States Patent
Yamagishi

(10) Patent No.: US 12,333,764 B2
(45) Date of Patent: Jun. 17, 2025

(54) COLOR ADJUSTMENT APPARATUS USED FOR COLOR MATCHING BETWEEN IMAGE CAPTURING APPARATUSES, COLOR ADJUSTMENT METHOD, AND STORAGE MEDIUM STORING COLOR ADJUSTMENT PROGRAM

(71) Applicant: CANON KABUSHIKI KAISHA, Tokyo (JP)

(72) Inventor: Masaharu Yamagishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/324,100

(22) Filed: May 25, 2023

(65) Prior Publication Data

US 2023/0419548 A1 Dec. 28, 2023

(30) Foreign Application Priority Data

Jun. 23, 2022 (JP) ................. 2022-101219

(51) Int. Cl.
*G06T 7/90* (2017.01)
*H04N 17/00* (2006.01)
(Continued)

(52) U.S. Cl.
CPC ............. *G06T 7/90* (2017.01); *H04N 17/002* (2013.01); *H04N 17/02* (2013.01); *H04N 23/84* (2023.01);
(Continued)

(58) Field of Classification Search
CPC ............. G06T 7/90; G06T 2207/10024; G06T 2207/20092; G06T 2207/20212;
(Continued)

(56) References Cited

U.S. PATENT DOCUMENTS

| | | | |
|---|---|---|---|
| 6,724,423 B1* | 4/2004 | Sudo ................ | H04N 23/84 348/E9.037 |
| 2003/0081118 A1* | 5/2003 | Cirulli ............... | H04N 9/11 348/E5.049 |

(Continued)

FOREIGN PATENT DOCUMENTS

| | | |
|---|---|---|
| JP | 2011-217091 | 10/2011 |
| KR | 20100049713 A  * | 5/2010 |

OTHER PUBLICATIONS

Extended European Search Report dated Nov. 8, 2023 in counterpart EP Application No. 23176402.8.

*Primary Examiner* — John W Miller
*Assistant Examiner* — Omer Khalid
(74) *Attorney, Agent, or Firm* — Venable LLP

(57) ABSTRACT

A color adjustment apparatus capable of displaying color matching accuracy in a visually intelligible manner. The apparatus includes a memory storing instructions, and a processor executing the instructions to obtain a first captured image by capturing a color chart including patches with a reference camera, obtain a second captured image by capturing the color chart with a target camera, obtain correction information for color matching, generate a third captured image by applying the correction information to the second captured image, output color difference signals of the first captured image and color difference signals of the third captured image, generate a first image based on color difference signals in areas corresponding to the patches among the color difference signals of the first captured image, and generate a second image based on color difference signals in areas corresponding to the patches among the color difference signals of the third captured image.

18 Claims, 14 Drawing Sheets

(51) Int. Cl.
*H04N 17/02* (2006.01)
*H04N 23/84* (2023.01)

(52) U.S. Cl.
CPC .............. *G06T 2207/10024* (2013.01); *G06T 2207/20092* (2013.01); *G06T 2207/20212* (2013.01)

(58) Field of Classification Search
CPC .... G06T 11/001; H04N 17/002; H04N 17/02; H04N 23/84; H04N 1/6055; H04N 9/64; H04N 25/611; G01R 13/208
USPC .................................................. 348/188, 186
See application file for complete search history.

(56) References Cited

U.S. PATENT DOCUMENTS

| | | | |
|---|---|---|---|
| 2008/0192120 A1* | 8/2008 | Corley | ................. H04N 17/002 348/188 |
| 2015/0103093 A1* | 4/2015 | Bryant | ................. H04N 1/6052 345/595 |
| 2020/0117890 A1* | 4/2020 | Park | ..................... G06V 40/103 |
| 2021/0004995 A1* | 1/2021 | Burg | ......................... G01J 3/50 |

* cited by examiner

*FIG. 5*

| PATCH | REFERENCE CAMERA | | | TARGET CAMERA | | |
|---|---|---|---|---|---|---|
| | R | G | B | R | G | B |
| COLOR PATCH301: R(255,0,0) | rR1 | rG1 | rB1 | tR1 | tG1 | tB1 |
| COLOR PATCH302: G(0,255,0) | rR2 | rG2 | rB2 | tR2 | tG2 | tB2 |
| COLOR PATCH303: B(0,0,255) | rR3 | rG3 | rB3 | tR3 | tG3 | tB3 |

FIG. 6

| PATCH | REFERENCE CAMERA | | | TARGET CAMERA | | |
|---|---|---|---|---|---|---|
| | X | Y | Z | X | Y | Z |
| COLOR PATCH301: R(255,0,0) | rX1 | rY1 | rZ1 | tX1 | tY1 | tZ1 |
| COLOR PATCH302: G(0,255,0) | rX2 | rY2 | rZ2 | tX2 | tY2 | tZ2 |
| COLOR PATCH303: B(0,0,255) | rX3 | rY3 | rZ3 | tX3 | tY3 | tZ3 |

ARITHMETIC MATRIX R  ARITHMETIC MATRIX T

| In | | | Out | | |
|---|---|---|---|---|---|
| R | G | B | R | G | B |
| 0 | 0 | 0 | 0 | 0 | 0 |
| 0 | 0 | 16 | 0 | 0 | 17 |
| 0 | 0 | 32 | 0 | 0 | 33 |

...

| 255 | 255 | 255 | 255 | 255 | 255 |

ENTIRE IMAGE

REFERENCE CAMERA IMAGE

TARGET CAMERA IMAGE

REFERENCE CAMERA IMAGE

TARGET CAMERA IMAGE

SUPERIMPOSED IMAGE

REFERENCE CAMERA IMAGE

TARGET CAMERA IMAGE

TARGET POSITIONS IN REFERENCE CAMERA IMAGE

SUPERIMPOSED IMAGE

NUMBER OF COLORS
OF COLOR PATCHES=20

NUMBER OF COLORS
OF COLOR PATCHES=20

NUMBER OF COLORS
OF COLOR PATCHES=12

COLOR ADJUSTMENT APPARATUS USED FOR COLOR MATCHING BETWEEN IMAGE CAPTURING APPARATUSES, COLOR ADJUSTMENT METHOD, AND STORAGE MEDIUM STORING COLOR ADJUSTMENT PROGRAM

BACKGROUND OF THE INVENTION

Field of the Invention

The present invention relates to a color adjustment apparatus used for color matching of a plurality of image capturing apparatuses, a color adjustment method, and a storage medium storing a color adjustment program.

Description of the Related Art

Conventionally, when images are captured using a plurality of cameras (image capturing apparatuses) at an image capturing site, color matching between the plurality of cameras is performed before capturing. Hereinafter, a camera serving as a reference for color matching is referred to as a reference camera, and a camera serving as a target for the color matching is referred to as a target camera.

Generally, in color matching between cameras, a color chart placed in a capturing environment is captured by each of the reference camera and target camera, and then a correction lookup table (referred to as a correction LUT) is generated based on the captured images. The correction LUT is correction information for matching the color of the image captured by the target camera with the color of the image captured by the reference camera. Thereafter, the color matching between the cameras is performed by applying the generated correction LUT to the target camera.

Color matching accuracy after the color matching between cameras is typically verified by visually comparing the image captured by the reference camera and an image obtained by applying the correction LUT to the image captured by the target camera. However, it is not easy to visually verify whether colors match one by one for each color in the images, and a display in which a coincidence of colors can be more intuitively recognized is desired.

Therefore, as a method for checking the color matching accuracy after the color matching, a technique that plots color difference signals (CbCr pixel information of an image) on a screen to display as a vector scope image (for example, Japanese Laid-Open Patent Publication (Kokai) No. 2011-217091 (JP 2011-217091A)). Since this technique displays the color difference signals of the captured image as the vector scope image, an effect of parameter adjustment can be easily understood in adjusting image quality.

However, when the reference camera image and the target camera image captured for the color matching are different in a capturing field angle, the images in areas other than the color chart are different. Moreover, when the color difference signals of the entire captured image are displayed as the vector scope image, the color difference signals in the region other than the color chart are also displayed. Accordingly, a user cannot easily grasp color shift or color difference of the color chart used for color matching at a glance, and it is not possible to intelligibly display the color matching accuracy.

SUMMARY OF THE INVENTION

The present invention provides a color adjustment apparatus that is capable of displaying color matching accuracy in a visually intelligible manner.

Accordingly, an aspect of the present invention provides a color adjustment apparatus including a memory device that stores a set of instructions, and at least one processor that executes the set of instructions to obtain a first captured image by capturing a color chart for color matching including patches with a first image capturing apparatus serving as a reference, obtain a second captured image by capturing the color chart with a second image capturing apparatus serving as a correction target, obtain correction information for the color matching, generate a third captured image by applying the correction information obtained to the second captured image obtained, output color difference signals of the first captured image obtained and color difference signals of the third captured image generated, and generate a first image based on color difference signals in areas corresponding to the patches in the color chart among the color difference signals of the first captured image output and a second image based on color difference signals in areas corresponding to the patches among the color difference signals of the third captured image output.

According to the present invention, the color matching accuracy can be displayed in a visually intelligible manner.

Further features of the present invention will become apparent from the following description of exemplary embodiments with reference to the attached drawings.

BRIEF DESCRIPTION OF THE DRAWINGS

FIG. 5 is a schematic view showing color patch pixel values (RGB values).

FIG. 6 is a schematic view showing color patch pixel values (XYZ values) corresponding to color patches.

FIG. 7 is a view showing an example of a correction LUT.

DESCRIPTION OF THE EMBODIMENTS

Figure 1:
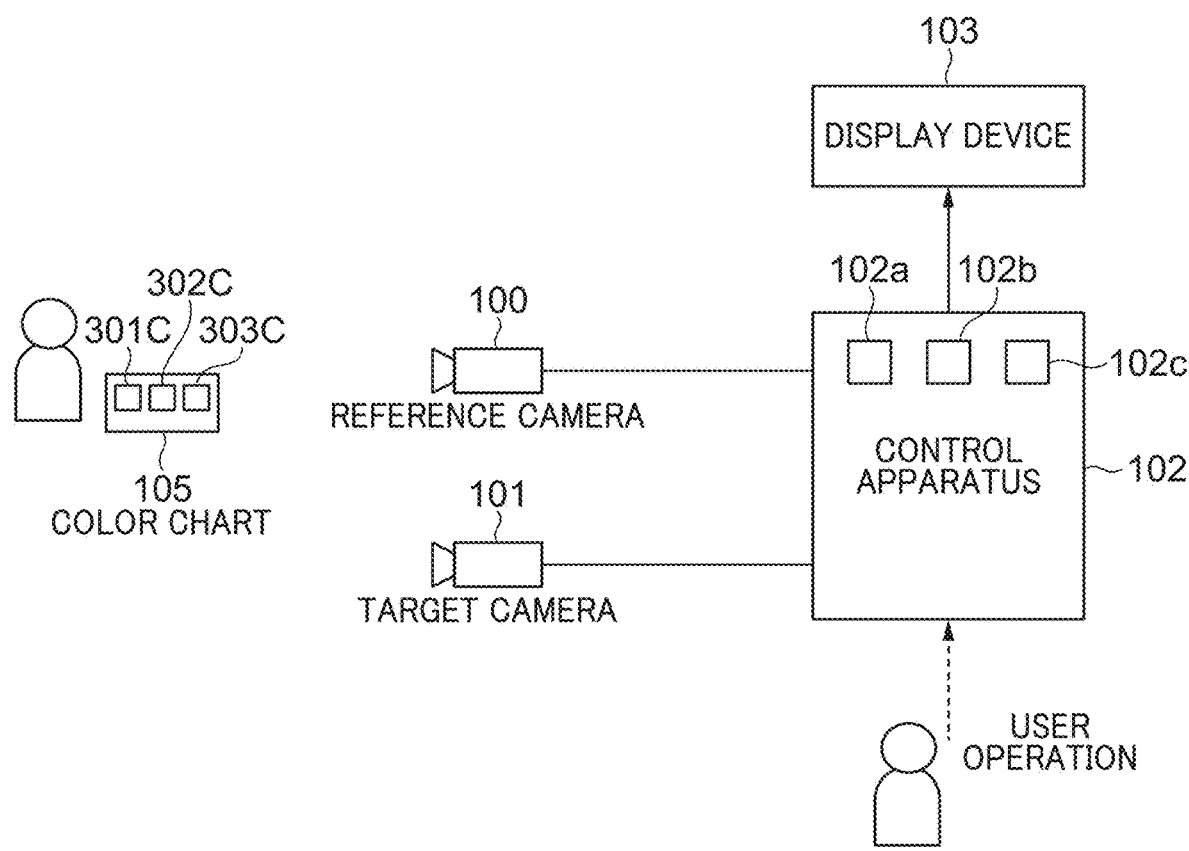
FIG. 1 is a schematic view showing a configuration of a color adjustment system including a color adjustment apparatus.

Hereafter, embodiments according to the present invention will be described in detail by referring to the drawings.

FIG. 1 is a schematic view showing a configuration of a color adjustment system including a color adjustment apparatus according to a first embodiment of the present invention. The color adjustment system includes a control apparatus 102 as a color adjustment apparatus, a first image capturing apparatus 100, a second image capturing apparatus 101, and a display device 103.

The control apparatus 102 include a CPU 102a, a ROM 102b, and a RAM 102c. The ROM 102b stores various programs and values used for control. The CPU 102a controls the entire system by running the programs stored in the ROM 102b. The RAM 102c provides a work area for the CPU 102a to perform a control program.

The first image capturing apparatus 100 is a reference camera serving as a reference for performing color matching in a color matching process between the image capturing apparatuses. The second image capturing apparatus 101 is a target camera serving as a color matching target (correction target). Each of the image capturing apparatuses 100 and 101 transmits an image obtained by capturing an object to the control apparatus 102 via a video line. It should be noted that transmission of the captured image via the video line is not indispensable, and a configuration without the video line can be achieved. For example, the captured image may be transferred via a recording medium such as a memory card, or the captured image may be transmitted and received by wireless communication.

In the color matching process, the image capturing apparatuses 100 and 101, which are arranged side-by-side, capture a color chart 105 for the color matching. The images captured by the image capturing apparatuses 100 and 101 are transmitted to the control apparatus 102. In the color chart 105, a plurality of color patches having different colors (for example, three patches 301C, 302C, and 303C are shown) are arranged. The color patches are measurement images. It should be noted that the number of color patches is not limited.

It should be noted that it is not indispensable to capture the images with the image capturing apparatuses 100 and 101 arranged side-by-side. For example, the image capturing apparatuses 100 and 101 may be captured one by one facing the color chart 105. Also, the positions of the image capturing apparatuses in capturing images may be separated from each other as long as the images of the image capturing apparatuses 100 and 101 include the image of the color chart 105.

Hereinafter, the images captured by the image capturing apparatuses 100 and 101 are respectively referred to as a reference camera image and a target camera image. The control apparatus 102 generates a correction LUT as correction information for color matching based on the reference camera image and the target camera image received from the image capturing apparatuses 100 and 101. The correction LUT is a lookup table used for bringing the colors of the target camera image close to the colors of the reference camera image. Further, the control apparatus 102 generates a confirmation image for confirming an effect of the generated correction LUT. The detailed operation of the control apparatus 102 related thereto will be described later.

The display device 103 displays a UI used when the control apparatus 102 generates the correction LUT and the confirmation image for confirming the effect of the correction LUT. The display device 103 is connected to the control apparatus 102 via a cable of a general image standard, such as HDMI (registered trademark) or DVI, and displays image information and other additional information on the screen. Specifically, the control apparatus 102 causes the display device 103 to display the reference camera image, the target camera image before applying the correction LUT, the target camera image after applying the correction LUT, and color difference signals (vector scope).

When the target camera images before and after applying the correction LUT are switched and displayed, these images can be easily compared. The images before and after applying the correction LUT may be displayed side by side. However, it is not indispensable to display the images before and after applying of the correction LUT.

The details of operations of the control apparatus 102 will now be described. The control apparatus 102 executes an LUT generation process and a color difference signal plotting process of an input captured image. First, the LUT generation process will be described with reference to FIG. 2 to FIG. 7.

Figure 2:
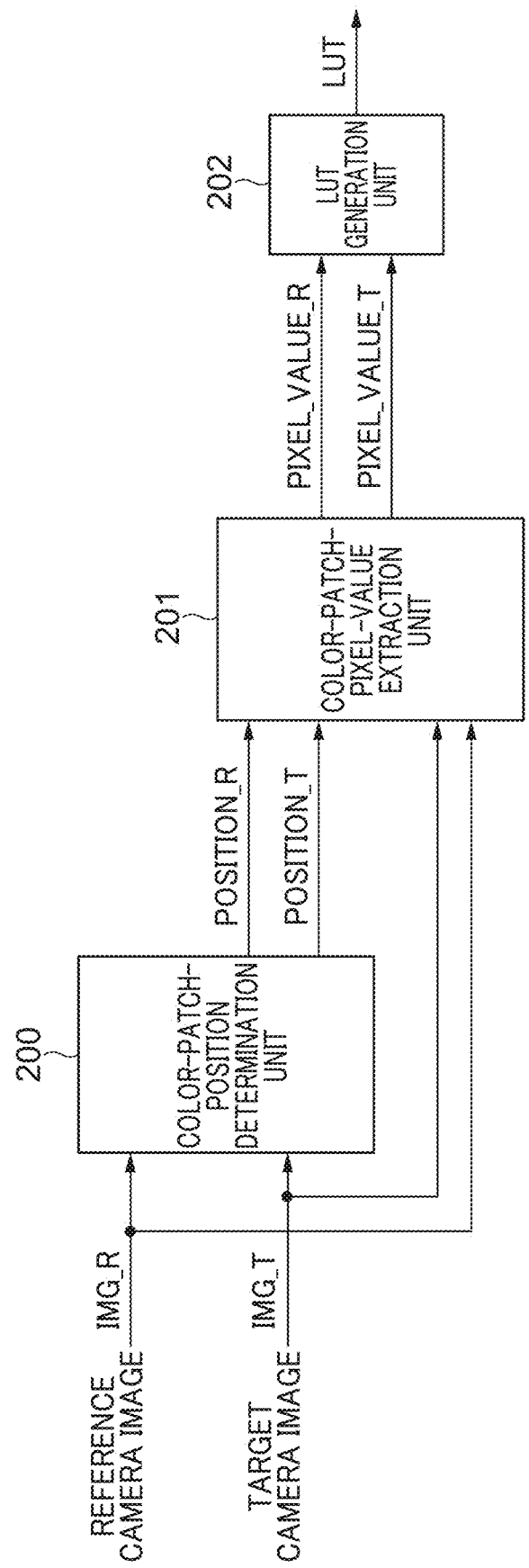
FIG. 2 is a functional block diagram showing a controller involved in a LUT generation process.

FIG. 2 is a functional block diagram showing the control apparatus 102 involved in the LUT generation process. The control apparatus 102 includes a color-patch-position determination unit 200, a color-patch-pixel-value extraction unit 201, and an LUT generation unit 202 as functional units related to the LUT generation process.

The functions of the color-patch-position determination unit 200, the color-patch-pixel-value extraction unit 201, and the LUT generation unit 202 are achieved by cooperation of the CPU 102a, ROM 102b, RAM 102c, etc. in the control apparatus 102. The reference camera image IMG_R and the target camera image IMG_T are input to the color-patch-position determination unit 200.

Figure 3A:
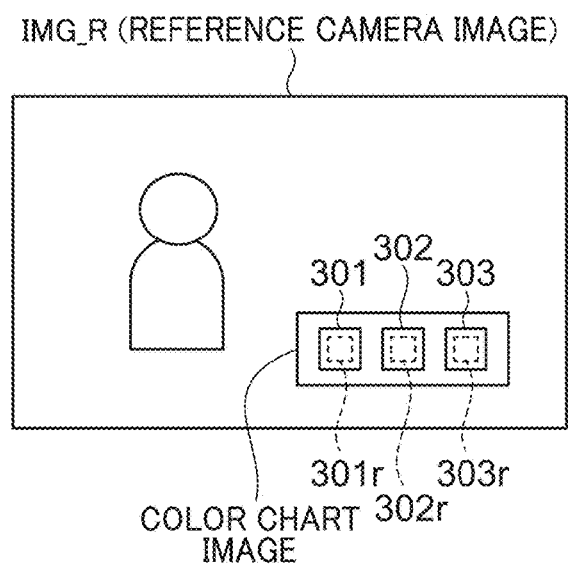
FIG. 3A and FIG. 3B are views respectively showing an example of a reference camera image and an example of a target camera image.
Figure 3B:
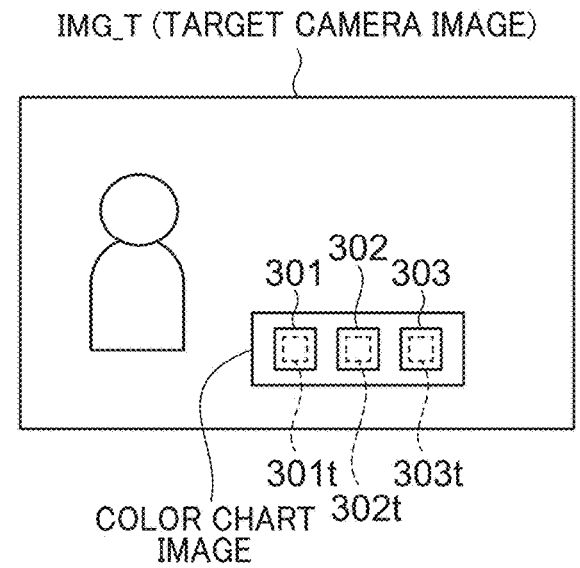

FIG. 3A and FIG. 3B are views respectively showing examples of the reference camera image IMG_R and the target camera image IMG_T. Each of the camera images IMG_R and IMG_T includes a color chart image corresponding to the color chart 105. Images corresponding to patches 301C, 302C, and 303C included in the color chart image in the camera images IMG_R and IMG_T are referred to as patch images 301, 302, and 303. The patch images 301, 302, and 303 are images of the patches 301C, 302C, and 303C in the color chart image. Here, the patches 301C, 302C, and 303C shall be color patches generated in red, green, and blue, respectively.

The color-patch-position determination unit 200 generates color patch position information POSITION_R about the reference camera image IMG_R and color patch position information POSITION_T about the target camera image IMG_T as follows.

First, the color-patch-position determination unit 200 receives designated positions of the patch images 301, 302, and 303 in the camera images IMG_R and IMG_T from the user via the UI. The user specifies a central position (centroid) or two or more vertices of the patch image 301, 302, and 303. The color-patch-position determination unit 200 determines extraction areas 301r, 302r, and 303r from the reference camera image IMG_R and determines extraction areas 301t, 302t, and 303t from the target camera image IMG_T based on the designated positions.

Each extraction area is rectangular as an example. It should be noted that the method of designating the positions of the patch images 301, 302, and 303 and the shape of each extraction area may be determined according to the types of the patches 301C, 302C, and 303C. These extraction areas are determined as many as the number of patches. The patch images 301, 302, and 303 included in the camera image IMG_R and the camera image IMG_T are obtained by capturing the same object. However, since the capturing field angles of the two image capturing apparatuses are different from each other, the coordinate positions of the rectangular extraction areas are different from each other.

The color-patch-position determination unit 200 generates position information POSITION_R indicating the extraction area 301r, 302r, and 303r and generates position information POSITION_T indicating the extraction area 301t, 302t, and 303t. Each of the position information POSITION_R and the position information POSITION_T includes a type of a color patch and rectangular area information (information about a horizontal start position (coordinate value), a vertical start position (coordinate value), a horizontal width, and a vertical width) associated with the type of the color patch. The color-patch-pixel-value extraction unit 201 receives the images IMG_R and IMG_T from the cameras and receives the position information POSITION_R and POSITION_T from the color-patch-position determination unit 200.

It should be noted that it is not indispensable to receive the designated position of the patch images 301, 302, and 303 from the user. For example, the positions of the patch images 301, 302, and 303 may be automatically specified from the input captured images using an inference process using an object detection AI or a rule-based algorithm.

The color-patch-pixel-value extraction unit 201 extracts RGB pixel values of areas (the extraction areas 301r, 302r, 303r, 301t, 302t, and 303t) corresponding to the color patches included in the captured images based on the position information POSITION_R and POSITION_T.

The RGB pixel values of the color patches extracted from the reference camera image IMG_R are output as the color patch pixel values PIXEL_VALUE_R in the reference camera image. That is, the color patch pixel values PIXEL_VALUE_R are the RGB pixel values of the extraction areas 301r, 302r, and 303r. Also, the RGB pixel values of the color patches extracted from the target camera image IMG_T are output as color patch pixel values PIXEL_VALUE_T in the target camera image. The color patch pixel values PIXEL_VALUE_T are the RGB pixel values of the extraction areas 301t, 302t, and 303t. Pixel values corresponding to the number of colors of the color patches are stored in the color patch pixel values PIXEL_VALUE_R and PIXEL_VALUE_T.

An average value of the pixel values in the designated color patch area is extracted as the RGB value. However, the method of extracting a pixel value is not limited to this method. For example, a pixel value at the center of the area may be extracted as the RGB value. When the average value of the pixel values in the area is extracted, a noise resistance becomes higher than the case where the pixel value at the center of the area is extracted as the RGB value although an arithmetic process occurs.

The color patch pixel values PIXEL_VALUE_R, PIXEL_VALUE_T are input to the LUT generation unit 202. The LUT generation unit 202 generates a correction LUT based on the color patch pixel values PIXEL_VALUE_R and PIXEL_VALUE_T. Here, the correction LUT is used to correct the color patch pixel values PIXEL_VALUE_T so as to match the color patch pixel values PIXEL_VALUE_R.

Figure 4:
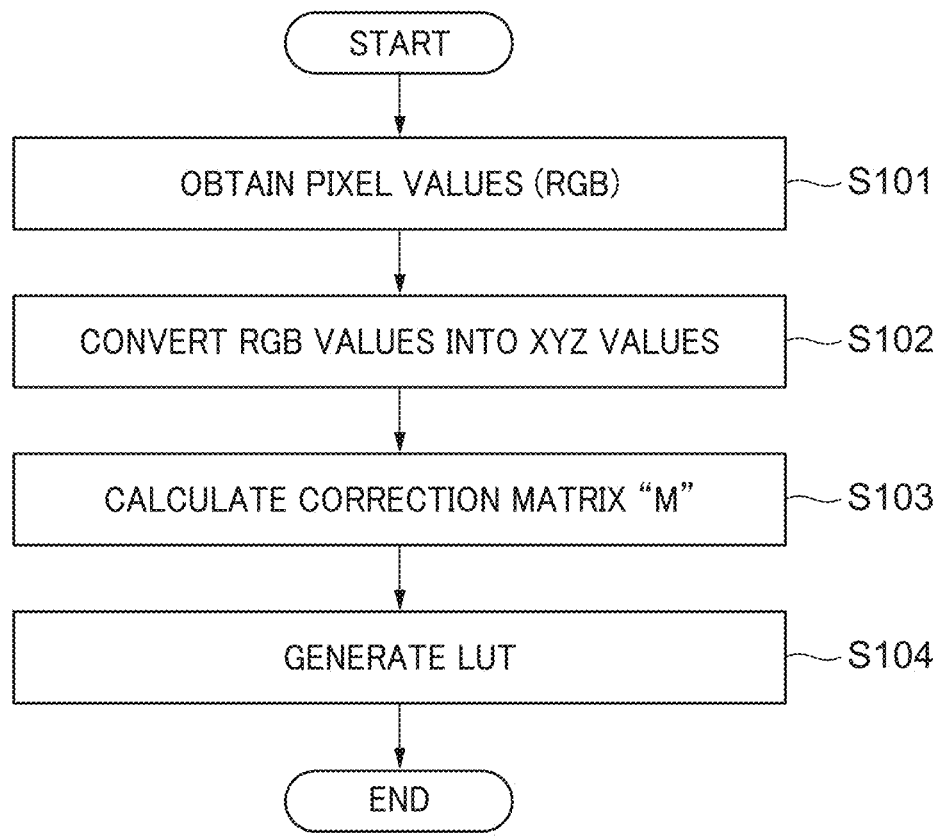
FIG. 4 is a flowchart showing a LUT generation process.

A process for generating the correction LUT by the LUT generation unit 202 will be described in detail with reference to FIG. 4. FIG. 4 is a flowchart showing an LUT generation process. This process is achieved by the CPU 102a developing a program stored in the ROM 102b to the RAM 102c and executing the program.

In a step S101, the LUT generation unit 202 obtains the color patch pixel values PIXEL_VALUE_R and PIXEL_VALUE_T from the color-patch-pixel-value extraction unit 201. In a step S102, the LUT generation unit 202 converts the RGB values of the color patch pixel values PIXEL_VALUE_R and PIXEL_VALUE_T into XYZ values. The RGB values are converted into the XYZ values by using the following formula 1, for example.

$$\begin{bmatrix} X \\ Y \\ Z \end{bmatrix} = \begin{bmatrix} RGB-to-XYZ \\ \text{Conversion Matrix} \end{bmatrix} \begin{bmatrix} R \\ G \\ B \end{bmatrix} \quad \text{Formula 1}$$

The RGB-to-XYZ conversion matrix in the formula 1 can be calculated using, for example, x-y coordinates of the display color gamut of the display device 103 and an x-y coordinate of a white point. Values obtained by normalizing the RGB values of each color patch are used as RGB values.

FIG. 5 is a schematic view showing the color patch pixel values (RGB values) corresponding to the patch images 301, 302, and 303 in both the captured images. FIG. 6 is a schematic view showing the color patch pixel values (XYZ values) corresponding to the patch images 301, 302, 303 in both the captured images. The RGB values (In) shown in FIG. 5 are converted into the XYZ values shown in FIG. 6 by using the RGB-to-XYZ conversion matrix (formula 1).

As shown in FIG. 6, the RGB values of the extraction areas 301r, 302r, and 303r in the reference camera image are converted to the XYZ values that constitute an arithmetic matrix R. The RGB values of the extraction areas 301t, 302t, and 303t in the target camera image are converted into the XYZ values that constitute an operation matrix T.

Next, in a step S103, the LUT generation unit 202 calculates a correction matrix M for matching the color of the target camera image to the color of the reference camera image. Here, the correction matrix M is a matrix for correcting the XYZ values of the color patch of the target camera image to the XYZ values of the color patch of the reference camera image. The correction matrix M is calculated by the following formula 2 using the calculated arithmetic matrixes R and T.

$$[\text{Correction Matrix } M] = [\text{Arithmetic Matrix } R][\text{Arithmetic Matrix } T]^{-1} \quad \text{Formula 2}$$

The LUT generation unit 202 generates a correction LUT using the correction matrix M calculated in the step S103 and outputs the generated correction LUT in a step S104, and finishes the process shown in FIG. 4.

Specifically, the LUT generation unit 202 calculates corrected XYZ values using the converted XYZ values and the correction matrix M in the step S104. Then, the LUT generation unit 202 calculates the corrected RGB values (Out) from the corrected XYZ values using the inverse matrix of the RGB-to-XYZ transformation matrix. The calculated relationship between In and Out of the RGB values is generated as a corrected LUT 106 as 3D-LUT.

FIG. 7 is a view showing an example of the correction LUT 106. The illustrated correction LUT includes 17×17×17 grid points and stores the corrected RGB values (Out) corresponding to the RGB values (In) of the grid points. It should be noted that the number of the grid points is not limited to the illustrated number. If the number of grid points is increased, the color matching accuracy will increase, but the scale of the process will increase. Conversely, if the number of grid points is made smaller, the scale of process will be smaller, but the color matching accuracy will be reduced. The user may appropriately determine these factors in consideration of cost effectiveness. The correction LUT is input to an LUT application unit 400 (FIG. 8) described later.

Although the number of the color patches included in the color chart 105 is three in this embodiment, the number is not limited to three. It is known that the accuracy increases as the number of colors used for generating the correction LUT increases. Since the calculation time increases as the number of color patches increases, the type and the number of patches of the color chart 105 used for the color matching may be selected in consideration of the trade-off between the accuracy and the calculation time.

Although the example in which the correction LUT is generated from two input captured images has been described, a configuration in which a correction LUT generated in advance is read may be employed. In this case, it is necessary to generate in advance a correction LUT that causes the target camera image to approach the reference camera image using the reference camera and the target camera.

Figure 8:
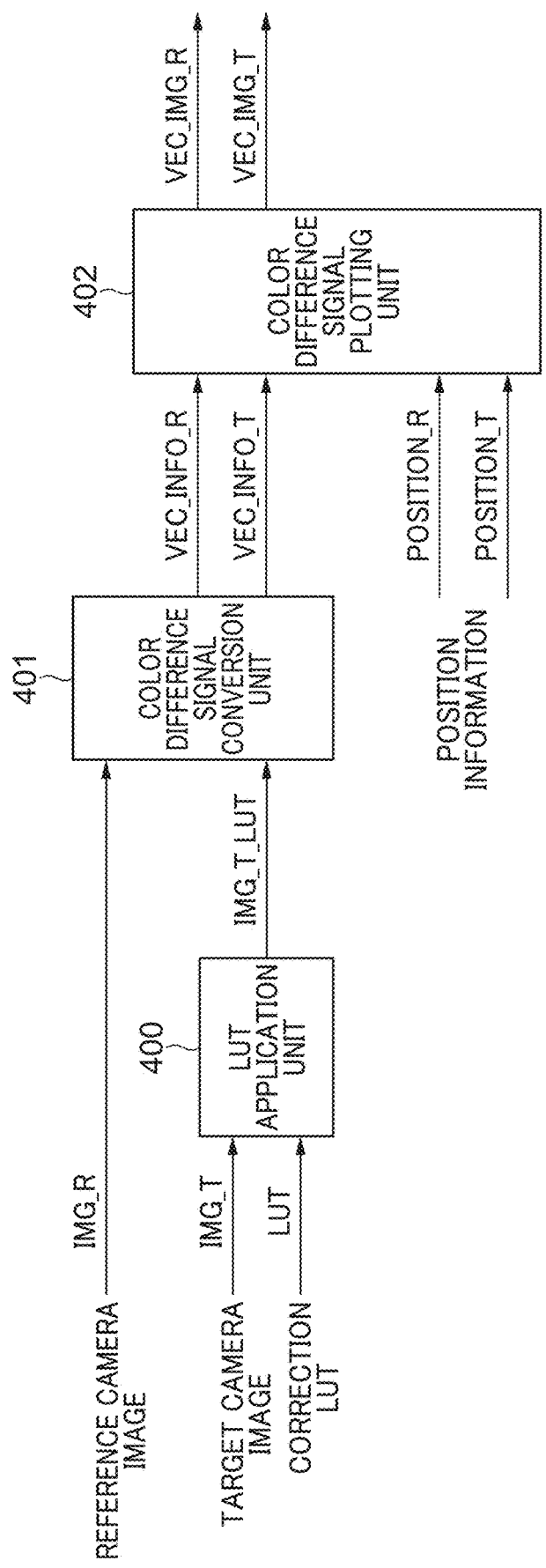
FIG. 8 is a functional block diagram showing a controller involved in a color difference signal plotting process in a first embodiment.

A color difference signal plotting process will now be described by referring to FIG. 8. FIG. 8 is a functional block diagram showing the control apparatus 102 related to the color difference signal plotting process in the first embodiment. The control apparatus 102 includes the LUT application unit 400, a color difference signal conversion unit 401, and a color difference signal plotting unit 402 as functional units related to the color difference signal plotting process. The functions of the LUT application unit 400, the color difference signal conversion unit 401, and the color difference signal plotting unit 402 are achieved by the cooperation of the CPU 102a, ROM 102b, and RAM 102c in the control apparatus 102.

The LUT application unit 400 as a second obtainment means obtains a target camera image IMG_T (second captured image). The LUT application unit 400 as a third obtainment means obtains the correction LUT 106 generated by the LUT generation unit 202 (FIG. 2). As described above, the correction LUT 106 to be obtained may be generated in advance and input from the outside.

The LUT application unit 400 as a correction means applies the correction LUT 106 to the target camera image IMG_T to generate a post LUT-application (post color matching) target camera image IMG_T_LUT (third captured image). Then, the LUT application unit 400 outputs the generated target camera image IMG_T_LUT to the color difference signal conversion unit 401.

The color difference signal conversion unit 401 as a first obtainment means obtains a reference camera image IMG_R (first captured image). In addition, the color difference signal conversion unit 401 obtains the post LUT-application target camera image IMG_T_LUT.

The color difference signal conversion unit 401 as an output means converts the format of the camera images IMG_R, IMG_T_LUT from the RGB format into the YCbCr format using the following formula 3 and outputs them as color difference signals. Here, the RGB-to-YCbCr conversion matrix may consist of values determined in accordance with an input color standard (BT.709 etc.).

$$\begin{bmatrix} Y \\ Cb \\ Cr \end{bmatrix} = \begin{bmatrix} RGB - \text{to} - YCbCr \\ \text{Conversion Matrix} \end{bmatrix} \begin{bmatrix} R \\ G \\ B \end{bmatrix} \quad \text{Formula 3}$$

That is, the color difference signal conversion unit 401 outputs the color difference signals VEC_INFO_R as the color difference signals of the reference camera image IMG_R and outputs the color difference signals VEC_INFO_T as the color difference signals of the target camera image IMG_T_LUT.

The color difference signal plotting unit 402 obtains the color difference signals VEC_INFO_R and VEC_INFO_T from the color difference signal conversion unit 401. Further, the color difference signal plotting unit 402 obtains pieces of position information POSITION_R and POSITION_T.

Here, the pieces of position information POSITION_R and POSITION_T are generated using a technique similar to the generation by the color-patch-position determination unit 200 (FIG. 2) in the LUT generation process. The pieces of position information POSITION_R and POSITION_T shall be designated by the user. Therefore, the extraction areas 301r, 302r and 303r are determined in the reference camera image IMG_R based on the position information POSITION_R. Also, the extraction areas 301t, 302t and 303t are determined in the target camera image IMG_T based on the position information POSITION_T. In the color difference signal plotting process, the extraction areas 301r, 302r, 303r, 301t, 302t, and 303t are "cut-out areas" from which the color difference signals are extracted.

The color difference signal plotting unit 402 as a generation means generates a vector scope image VEC_IMG_R (first image) from the color difference signals VEC_INFO_R based on the position information POSITION_R. The color difference signal plotting unit 402 also generates a vector scope image VEC_IMG_T (second image) from the color difference signals VEC_INFO_T based on the position information POSITION_T.

The color difference signals VEC_INFO_R and VEC_INFO_T represent the entire captured images. In the meantime, the vector scope image VEC_IMG_R is based only on the color difference signals of the extraction areas 301r, 302r, and 303r corresponding to the patches in the color difference signals VEC_INFO_R. The vector scope image VEC_IMG_T is based only on the color difference signals of the extraction areas 301t, 302t, and 303t corresponding to the patches in the color difference signals VEC_INFO_T.

Figure 9:
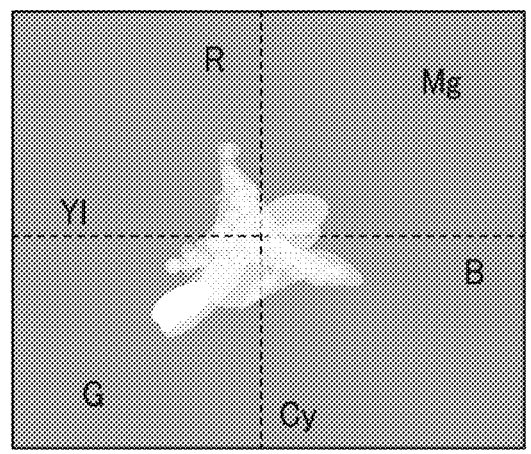
FIG. 9 is a view showing an example of color difference signals of the entire captured image displayed on a screen.
Figure 10A:
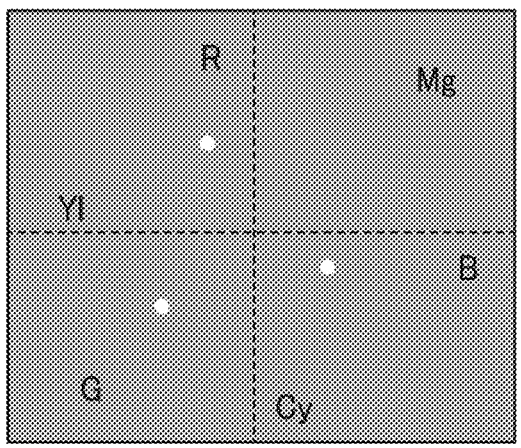
FIG. 10A and FIG. 10B are views showing examples of vector scope images displayed on the screen.
Figure 10B:
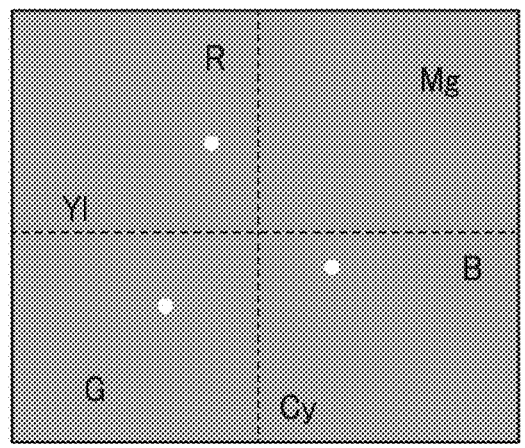

The control apparatus 102 (the color difference signal plotting unit 402) causes the display device 103 to display the vector scope image VEC_IMG_R and the vector scope image VEC_IMG_T as described latter by referring to FIG. 9, FIG. 10A, and FIG. 10B. Specifically, the control apparatus 102 clips the color difference signals of areas outside the extraction areas among the color difference signals VEC_INFO_R and VEC_INFO_T to "0". By performing such a process, only the color difference signals within the extraction areas are plotted as the color difference signals for the captured image, while the color difference signals outside the extraction areas are not plotted.

FIG. 9 is a view showing an example of displaying color difference signals of the input entire captured image on a screen. FIG. 10A and FIG. 10B are views that respectively show examples in which the vector scope images VEC_IMG_R and VEC_IMG_T are displayed on the screen.

In the images shown in FIG. 9, FIG. 10A, and FIG. 10B, the color difference signals (Cb, Cr) are two-dimensionally plotted on a coordinate system of which a horizontal axis is a Cb axis and a vertical axis is a Cr axis.

As shown in FIG. 10A and FIG. 10B, the vector scope images VEC_IMG_R and VEC_IMG_T are displayed side-by-side by dividing one screen into two or using two screens. Thus, the colors of the color patches included in the color chart 105 can be displayed in a pinpoint manner. Therefore, the color difference signals of each patch color can be compared in the pinpoint manner by comparing the image in FIG. 10A with the image in FIG. 10B, which allows the user to easily check the color coincidence of the colors in the color matching.

As described above, since only the color difference signals of the cut-out areas in the captured images are plotted and displayed on the screen, the color matching accuracy after the color matching can be easily recognized even when the field angles of the two images are different.

According to this embodiment, the vector scope image VEC_IMG_R is generated based only on the color difference signals in the extraction areas 301*r*, 302*r*, and 303*r* corresponding to the patches in the color chart 105 among the reference camera image IMG_R. In addition, the vector scope image VEC_IMG_T is generated based only on the color difference signals of the extraction areas 301*t*, 302*t*, and 303*t* corresponding to the patches in the post LUT-application (post color matching) target camera image IMG_T_LUT. The vector scope images VEC_IMG_R and VEC_IMG_T are displayed side by side. Therefore, the color matching accuracy becomes visually recognizable.

It should be noted that the image of color difference signals of the entire captured image (FIG. 9) and the vector scope images (FIG. 10A and FIG. 10B) may be switched using a display mode switching UI (not shown). For example, when the user selects an "entire mode" for displaying the color difference signals of the entire captured image, the image in FIG. 9 is displayed. And when the user selects a "chart mode" for displaying only the color difference signals in the cut-out areas, the images in FIG. 10A and FIG. 10B are displayed. It should be noted that the vector scope images VEC_IMG_R and VEC_IMG_T are not necessarily displayed side by side. For example, the vector scope image VEC_IMG_R (FIG. 10A) and the vector scope image VEC_IMG_T (FIG. 10B) may be switched and displayed in response to a user operation.

It should be noted that the pieces of position information POSITION_R and POSITION_T in the color difference signal plotting process may be generated by a method different from that in generating the correction LUT. An extraction area (a cut-out area) may not be a part of each of the patch images 301, 302, and 303 in each captured image and may be the entire region of each of the patch images 301, 302, and 303.

The extraction areas 301*r*, 302*r*, and 303*r* may be determined based on the field angle ratio of the color chart image included in the reference camera image IMG_R. Similarly, the extraction areas 301*t*, 302*t*, and 303*t* may be determined based on the field angle ratio of the color chart image included in the target camera image IMG_T. For example, when the field angle ratio of the color chart is large, the cut-out area may be decreased. When the field angle ratio of the color chart is small, the cut-out area may be increased. In other words, when the field angle ratio is a second value larger than a first value, the cut-out area in the patch image is smaller than that where the field angle ratio is the first value.

In this way, even when the field angle of the color chart image included in the captured image is small, an amount of information for plotting the color difference signals increases, and thus it is possible to generate the color difference signals that are easy to visually recognize. In addition, the same effect can be obtained by a simple method that expands and plots the points when the field angle ratio of the color chart image is smaller than a certain value.

A second embodiment of the present invention will now be described. In the first embodiment, the example in which the color difference signals of only the extraction area (cut-out area) are plotted and displayed for each of the reference camera image and the target camera image has been described. In the meantime, in the second embodiment, an example in which the color difference signals of only the extraction area of both the reference camera image and the target camera image are displayed in an overlapping manner will be described.

Thus, in this embodiment, the color difference signal plotting process is different from the first embodiment and the LUT generation process is the same as in the first embodiment.

Figure 11:
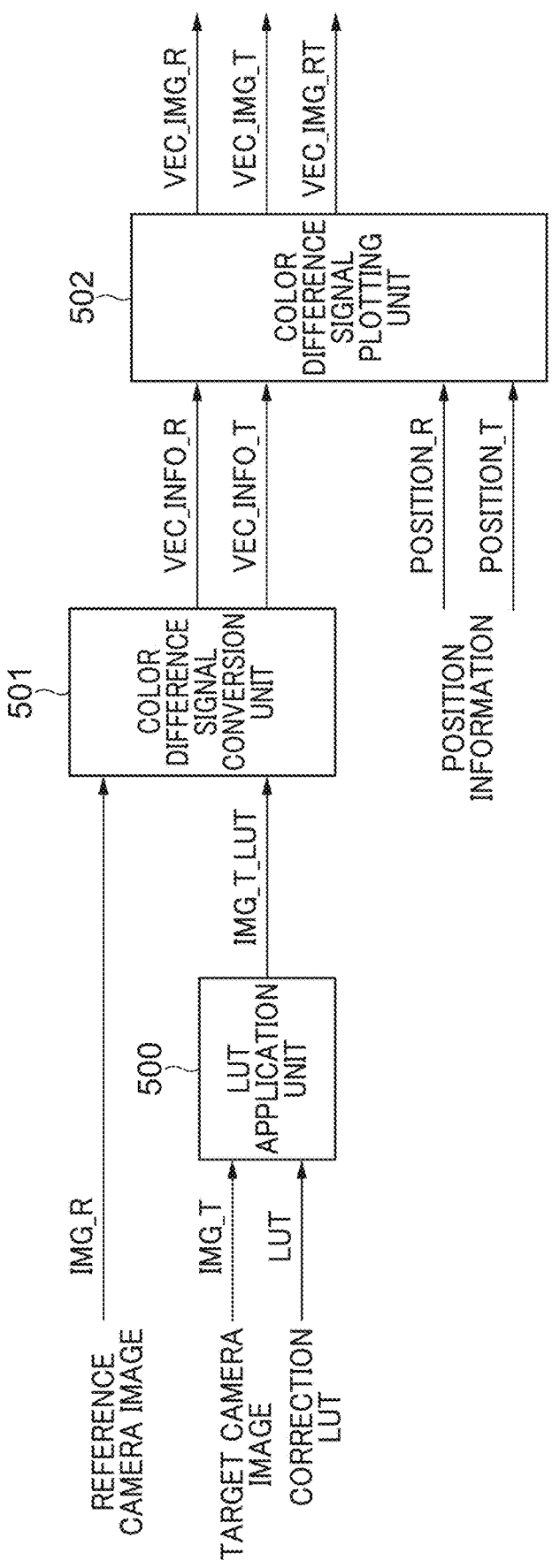
FIG. 11 is a functional block diagram showing a controller involved in a color difference signal plotting process in a second embodiment.

FIG. 11 is a functional block diagram showing a control apparatus 102 involved in a color difference signal plotting process in the second embodiment. The control apparatus 102 includes an LUT application unit 500, a color difference signal conversion unit 501, and a color difference signal plotting unit 502 as functional units related to the color difference signal plotting process. The basic functions of the LUT application unit 500, the color difference signal conversion unit 501, and the color difference signal plotting unit 502 are the same as those of the LUT application unit 400, the color difference signal conversion unit 401, and the color difference signal plotting unit 402 shown in FIG. 8, respectively. However, the color difference signal plotting unit 502 is different from the color difference signal plotting unit 402, further generates a superimposed image VEC_IMG_RT. It should be noted that it is not indispensable to display the vector scope images VEC_IMG_R and VEC_IMG_T described in the first embodiment.

The superimposed image VEC_IMG_RT is generated by superimposing the vector scope image VEC_IMG_R and the vector scope image VEC_IMG_T. The control apparatus 102 displays the superimposed image VEC_IMG_RT on the same screen of the display device 103. Display examples thereof will be described with reference to FIG. 12A, FIG. 12B, and FIG. 12C.

Figure 12A:
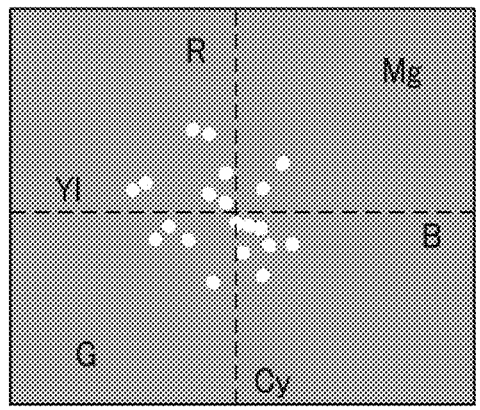
FIG. 12A, FIG. 12B, and FIG. 12C are views showing examples of vector scope images and a superimposed image displayed on the screen.
Figure 12B:
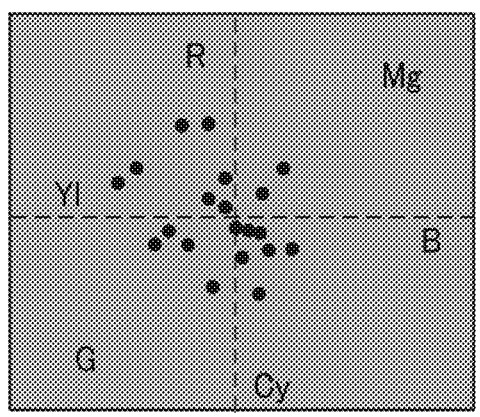
Figure 12C:
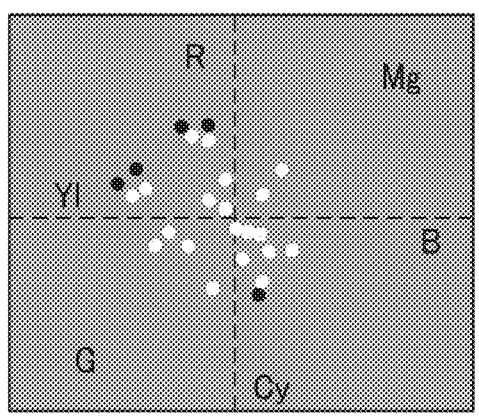

FIG. 12A and FIG. 12B respectively show examples of the vector scope images VEC_IMG_R and VEC_IMG_T displayed on the screen. FIG. 12C is a view showing an example of the superimposed image VEC_IMG_RT displayed on the screen.

In the first embodiment, the number of the color patches included in the color chart 105 is three (three colors). In FIG. 12A, FIG. 12B, and FIG. 12C, the number of the color patches is twenty (twenty colors). As described above, it is not indispensable to display the screens shown in FIG. 12A and FIG. 12B.

The color difference signal plotting unit 502 plots the vector scope images VEC_IMG_R and VEC_IMG_T in mutually different colors. For example, the color difference signal plotting unit 502 plots the vector scope image VEC_IMG_R in white and the vector scope image VEC_IMG_T in black. The colors are not limited thereto.

As shown in FIG. 12C, the color difference signal plotting unit 502 plots the vector scope image VEC_IMG_R (an upper hierarchical layer) so as to be superimposed on the vector scope image VEC_IMG_T. Therefore, only the vector scope image VEC_IMG_R is visually recognized in a portion where display positions of both color difference signals are mutually overlapped with respect to colors having a small color shift. In the meantime, since display positions of color difference signals of two colors having a large color shift are separated from each other, the shifted color is conspicuous, and the shift of the color difference signals can be recognized at a glance. The example in FIG. 12C shows that large shifts remain in a red (R) direction, a yellow (Yl) direction, and a cyan (Cy) direction. It does not matter which one of the vector scope images VEC_IMG_R and VEC_IMG_T is arranged in the upper hierarchical layer.

In a case where the display colors of the vector scope images VEC_IMG_R and VEC_IMG_T are green and red, respectively, only a portion where the colors are shifted is displayed in red. Therefore, it is also possible to match with the sense generally used for warning (red indicates warning).

According to this embodiment, the superimposed image VEC_IMG_RT in which vector scope images VEC_IMG_R and VEC_IMG_T are superimposed is displayed. Therefore, the same effect as that of the first embodiment can be achieved with respect to ease of visual recognition of the color matching accuracy.

In addition, since the vector scope images VEC_IMG_R and VEC_IMG_T are plotted in colors different from each other, the color matching accuracy can be understood more easily.

It should be noted that the color difference signal plotting unit 502 may determine plotting colors of the vector scope images VEC_IMG_R and VEC_IMG_T in accordance with the coincidence of these vector scope images for each color of a patch.

For example, the color difference signal plotting unit 502 uniformly determines the plotting color of the vector scope image VEC_IMG_R to be a predetermined color (e.g., white). The color difference signal plotting unit 502 determines the plotting color of the vector scope image VEC_IMG_T to be green for a color whose coincidence between the vector scope images VEC_IMG_R and VEC_IMG_T is higher than a predetermined value among the colors of the patches. The color difference signal plotting unit 502 determines the plotting color of the vector scope image VEC_IMG_T to be red for a color whose coincidence is lower than the predetermined value.

In this way, the color coincidence can be recognized at a glance. The color coincidence may be calculated using the reference camera image and target camera image according to a general indicator (for example, CIE2000). It should be noted that the plotting color of the vector scope image VEC_IMG_R may also be determined corresponding to the color coincidence.

In addition to this, an area in which the color difference signals overlap between the vector scope images VEC_IMG_R and VEC_IMG_T may be plotted and displayed in a color different from the plotting colors of the vector scope images VEC_IMG_R and VEC_IMG_T. For example, in the case where the plotting colors of the vector scope images VEC_IMG_R and VEC_IMG_T are green and red, respectively, the area in which the color difference signals overlap may be displayed in yellow. In this way, it is possible to recognize a direction of the color shift at a glance.

In addition, the color difference signal plotting unit 502 may generate another superimposed image in which the color difference signals VEC_INFO_R of the reference camera image IMG_R and the color difference signals of the target camera image IMG_T before application of the correction LUT are superimposed. Then, the control apparatus 102 may switch and display the superimposed image VEC_IMG_RT and the other superimposed image. For example, when both the superimposed images are switched and displayed in response to a user instruction, the user can easily confirm the matching states of the colors before and after applying the correction LUT at a glance.

A third embodiment of the present invention will now be described. In the third embodiment, a superimposed image in which an image indicating the target position of the color difference signals VEC_INFO_R for each color is superimposed on the color difference signals VEC_INFO_R is generated. Other configurations in this embodiment are the same as those in the second embodiment.

Figure 13A:
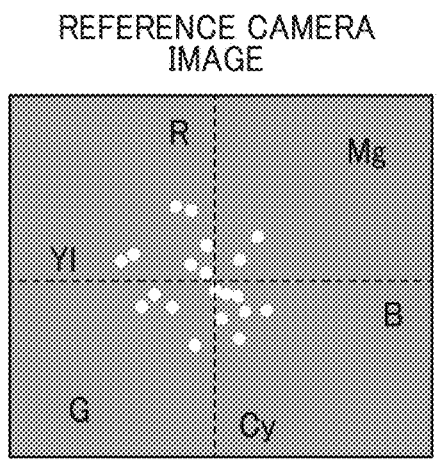
FIG. 13A, FIG. 13B, FIG. 13C, and FIG. 13D are views showing examples of vector scope images, target rectangles, and a superimposed image displayed on the screen.
Figure 13B:
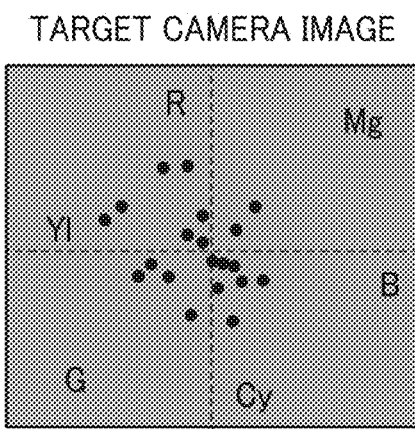
Figure 13C:
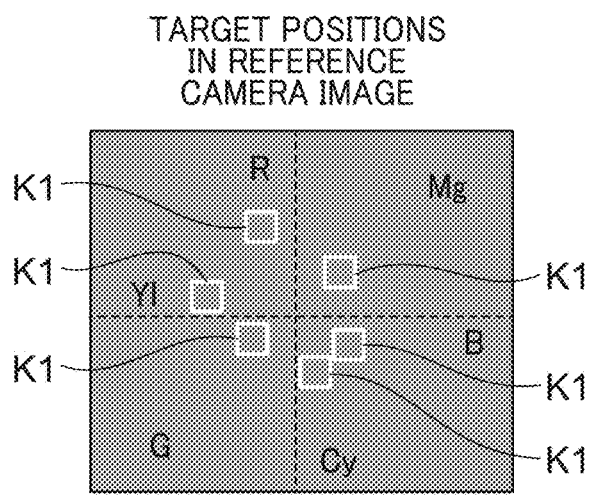
Figure 13D:
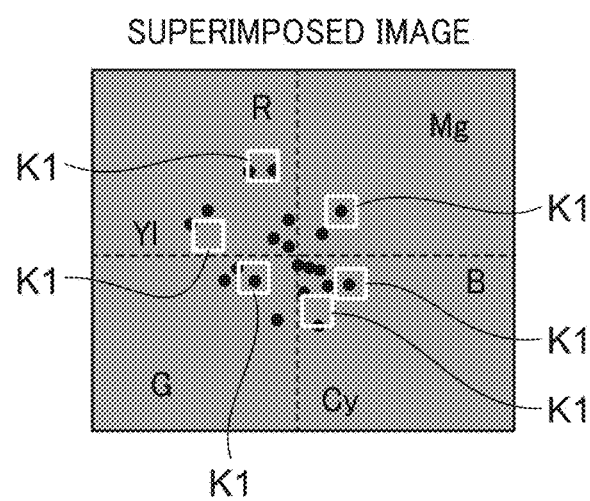

FIG. 13A and FIG. 13B respectively show examples of the vector scope images VEC_IMG_R and VEC_IMG_T displayed on the screen. FIG. 13C is a view showing an example in which target rectangles K1 are displayed on a screen. FIG. 13D is a view showing an example a superimposed image in which the target rectangles K1 are superimposed on the vector scope image VEC_IMG_T displayed on the screen.

The screens shown in FIG. 13A and FIG. 13B are similar to those shown in FIG. 12A and FIG. 12B. It is not indispensable to display the screens shown in FIG. 13A, FIG. 13B, and FIG. 13C.

Here, a target rectangle K1 is an example of an image indicating a target position of the color difference signals VEC_INFO_R for each color. To be specific, the target rectangle K1 is a frame indicating a predetermined area based on each target position. It should be noted that the predetermined area may be a fixed area. The target rectangles K1 may be provided corresponding to all colors. However, only the target rectangles corresponding to some predetermined colors are displayed in this embodiment. For example, the target rectangles K1 indicating target positions corresponding to red (R), green (G), blue (B), cyan (Cy), magenta (Mg), and yellow (Yl) among the patch colors are displayed.

A superimposed image shown in FIG. 13D is generated by superimposing the image shown in FIG. 13C on the image shown in FIG. 13B. As understood from FIG. 13D, the larger the color shift is, the more distant the vector scope image VEC_IMG_T from the target rectangle K1 is. Therefore, the shift of the color difference signals can be visually recognized at a glance. In the example shown in FIG. 13D, large shifts occur in the red (R) direction, the yellow (Yl) direction, and the cyan (Cy) direction.

According to this embodiment, the superimposed image in which the target rectangles K1, which are images indicating the target positions of the color difference signals VEC_INFO_R for each color, are superimposed on the color difference signals VEC_INFO_R is generated and displayed. Therefore, the same effect as that of the first embodiment can be achieved with respect to ease of visual recognition of the color matching accuracy. In particular, the shift of the color difference signals can be visually recognized at a glance.

Although the target rectangle K1 is a rectangle, the shape of the image indicating the target position is not limited to a rectangle as long as the shape allows the target position to be visually recognized. For example, an arbitrary figure such as a circle, a triangle, or a rhombus, may be employed. In addition, it is not indispensable that the image indicating the target position is based on the center position.

The area of the target rectangle K1 (the area of the image indicating the target position) may be determined based on a limit area in which a color difference can be recognized by human eyes. For example, the image size of the target rectangle K1 can be determined in accordance with the visual recognition capability of human eyes. Specifically, an area in which a person cannot visually recognize a color difference may be determined as the area of the image with respect to the median coordinate of the target position. In this way, the user can confirm the allowable color shift at a glance. The area in which a person cannot visually recognize the color difference can be determined based on the CIE2000.

Although the example in which the target positions are displayed for six colors of red (R), green (G), blue (B), cyan (Cy), magenta (Mg), and yellow (Yl) has been described, other display methods may be employed. For example, color pairs of the vector scope image VEC_IMG_T and the target rectangles K1 may be displayed in each of four quadrants divided by the Cb and Cr axes to be plotted. This makes it easy to visually recognize a shift from the target position without overlapping the colors. Further, when the user switches the display while designating the color to be checked, the user can check the shifts from the target positions for all the colors.

A fourth embodiment of the present invention will now be described. In the fourth embodiment, display of color difference signals corresponding to a part of colors among a plurality of patch colors is limited (not displayed). Other configurations are the same as those of the first embodiment.

Figure 14A:
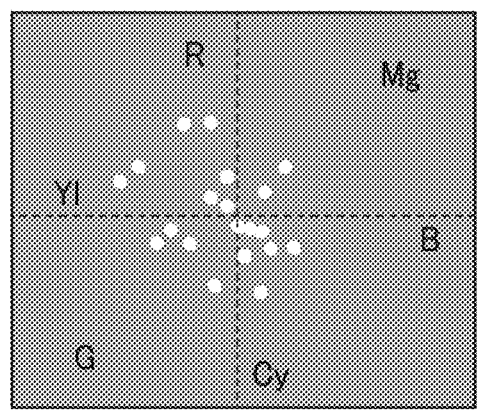
FIG. 14A, FIG. 14B, and FIG. 14C are views showing examples of vector scope images corresponding to patches of 20 colors and a vector scope image in which the color difference signals corresponding to some colors are limited to display.
Figure 14B:
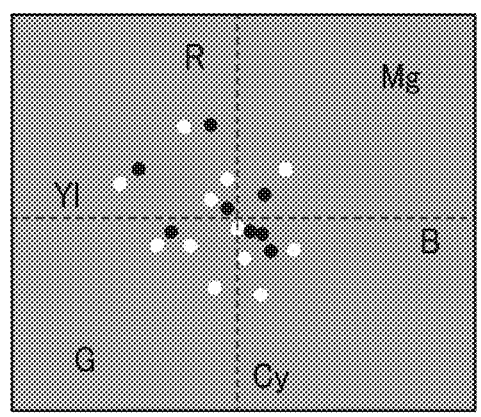

FIG. 14A and FIG. 14B are schematic views showing the vector scope image VEC_IMG_R corresponding to the patches of 20 colors. In FIG. 14B, color difference signals corresponding to colors to be displayed among the patches of 20 colors are shown in white, and color difference signals not to be displayed among the patches of 20 colors are shown in black.

Figure 14C:
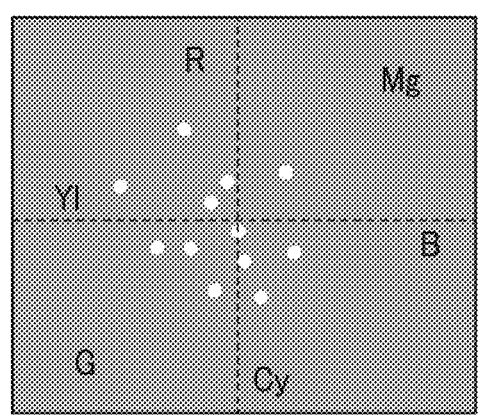

FIG. 14C is a view showing an example in which the vector scope image VEC_IMG_R in which display of color difference signals corresponding to some colors is limited is displayed on the screen. Although FIG. 14A, FIG. 14B, and FIG. 14C show the generation and display of the vector scope image VEC_IMG_R as a representative, the vector scope image VEC_IMG_T is also subjected similarly.

When the number of the patch colors is large and the color difference signals corresponding to the patches are close to each other, the plotting areas are likely to overlap with each other, and it may be difficult to distinguish the correspondence of colors. Therefore, in such a case, the number of colors for plotting color difference signals is limited.

When the number of colors is limited so as to reduce 8 colors (black circles) and display 12 colors (white circles) out of the 20 colors of the patches shown in FIG. 14B, the screen shown in FIG. 14C is obtained. By performing such a process, it becomes easy to grasp the color shifts with respect to the important colors. Similar to the vector scope image VEC_IMG_R shown in FIG. 14C, the vector scope image VEC_IMG_T is also generated with the limited number of colors (not shown).

The following criteria for limiting the number of colors may be considered. First, when there are a plurality of colors of which the color difference signals are closer than a threshold among the colors of the patches, the color difference signal plotting unit 402 excludes at least one color among the plurality of colors and generates the vector scope images VEC_IMG_R and VEC_IMG_T.

For example, when there are a plurality of colors of which the color difference signals are closer than the threshold among the colors of the patches, the color difference signal plotting unit 402 may generate the vector scope images VEC_IMG_R and VEC_IMG_T without excluding the color having the highest saturation. That is, when the vector scope image is generated, the saturation may be prioritized, and the color difference signals of the color having the lowest saturation may be excluded, or the color difference signals of the colors other than the color having the highest saturation may be excluded.

Alternatively, when there are a plurality of colors of which the color difference signals are closer than the threshold among the colors of the patches, the color difference signal plotting unit 402 may generate the vector scope image VEC_IMG_R and the VEC_IMG_T without excluding the color having the largest color shift among the colors of the patches. That is, when generating the vector scope image, the color shift may be prioritized, and the color difference signals of the color with the lowest color shift may be excluded, or the color difference signals of colors other than the color with the highest color shift may be excluded.

Alternatively, a color in which the color difference signals are close may be replaced by a single color. Alternatively, the number of colors in a portion selected by the user may be limited.

In each of the above embodiments, the vector scope images are exemplified as the first image and the second image based only on color difference signals. However, the present invention is not limited thereto. For example, waveform images may be used.

According to this embodiment, the same effect as that of the first embodiment can be achieved with respect to ease of visual recognition of the color matching accuracy. In particular, since the color difference signals corresponding to some of the colors of the plurality of patch colors are not displayed, the color matching accuracy can be easier to recognize.

Although the present invention has been described in detail on the basis of the suitable embodiments, the present invention is not limited to these specific embodiments, and various configurations that do not deviate from the scope of the present invention are also included in the present invention. Some of the above-described embodiments may be appropriately combined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-101219, filed Jun. 23, 2022, which is hereby incorporated by reference herein in its entirety.

What is claimed is:

1. A color adjustment apparatus comprising:
a memory device that stores a set of instructions; and
at least one processor that executes the set of instructions to:
obtain a first captured image by capturing a color chart for color matching including patches with a first image capturing apparatus serving as a reference;
obtain a second captured image obtained by capturing the color chart with a second image capturing apparatus serving as a correction target;
obtain correction information for the color matching;
generate a third captured image by applying the correction information to the second captured image;
output color difference signals of the first captured image and color difference signals of the third captured image; and
generate first and second images, the first image being generated based on the color difference signals of the first captured image and first positional information indicating areas corresponding to the patches in the color chart of the first captured image by extracting the area indicated by the first positional information from the first captured image, and the second image being generated based on the color difference signals of the third captured image and second positional information indicating areas corresponding to the patches in the color chart of the second captured image by extracting the area indicated by the second positional information from the third captured image.

2. The color adjustment apparatus according to claim 1, wherein the at least one processor executes the set of instructions to generate a superimposed image in which the first image and the second image are superimposed.

3. The color adjustment apparatus according to claim 2, wherein the at least one processor executes the set of instructions to generate the superimposed image by superimposing the first image on the second image.

4. The color adjustment apparatus according to claim 2, wherein the at least one processor executes the set of instructions to plot the first image and the second image in different colors.

5. The color adjustment apparatus according to claim 2, wherein the at least one processor executes the set of instructions to determine colors for plotting the first image and the second image in accordance with coincidence of the first image and the second image for each of colors of the patches.

6. The color adjustment apparatus according to claim 1, wherein the at least one processor executes the set of instructions to generate a superimposed image in which an image showing a target position of the first image for each color is superimposed on the second image.

7. The color adjustment apparatus according to claim 6, wherein the image showing the target position is an image showing a predetermined area based on the target position.

8. The color adjustment apparatus according to claim 1, wherein the at least one processor executes the set of instructions to generate, in a case where there are a plurality of colors whose color difference signals are closer than a threshold among the colors of the patches, the first image and the second image while excluding at least one of the plurality of colors.

9. The color adjustment apparatus according to claim 8, wherein the at least one processor executes the set of instructions to generate the first image and the second image without excluding a color having the highest saturation in the case where there are the plurality of colors whose color difference signals are closer than the threshold among the colors of the patches.

10. The color adjustment apparatus according to claim 8, wherein the at least one processor executes the set of instructions to generate the first image and the second image without excluding a color having the largest color shift among the colors of the patches in the case where there are the plurality of colors having color difference signals are closer than the threshold among the colors of the patches.

11. The color adjustment apparatus according to claim 1, wherein the at least one processor executes the set of instructions to display the first image and the second image on a screen.

12. The color adjustment apparatus according to claim 1, wherein the correction information is generated based on an image obtained by capturing the color chart by the first image capturing apparatus and an image obtained by capturing the color chart by the second image capturing apparatus.

13. The color adjustment apparatus according to claim 1, wherein the correction information is a lookup table for bringing a color of an image captured by the second image capturing apparatus closer to a color of an image captured by the first image capturing apparatus.

14. The color adjustment apparatus according to claim 1, wherein areas corresponding to the patches in generating the first image and areas corresponding to the patches in generating the second image are determined by a user.

15. The color adjustment apparatus according to claim 1, wherein areas corresponding to the patches in generating the first image are determined based on a field angle ratio of the color chart included in the first captured image, and areas corresponding to the patches in generating the second image are determined based on a field angle ratio of the color chart included in the second captured image.

16. A color adjustment method comprising:
obtaining a first captured image by capturing a color chart for color matching including patches by a first image capturing apparatus serving as a reference;
obtaining a second captured image by capturing the color chart with a second image capturing apparatus serving as a correction target;
obtaining correction information for the color matching;
generating a third captured image by applying the correction information to the second captured image;
outputting color difference signals of the first captured image and color difference signals of the third captured image; and
generating first and second images, the first image being generated based on the color difference signals of the first captured image and first positional information indicating areas corresponding to the patches in the color chart of the first captured image by extracting the area indicated by the first positional information from the first captured image, and the second image being generated based on the color difference signals of the third captured image and second positional information indicating areas corresponding to the patches in the color chart a of the second captured image by extracting the area indicated by the second positional information from the third captured image.

17. A non-transitory computer-readable storage medium storing a color adjustment program causing a computer to execute a color adjustment method comprising:
obtaining a first captured image by capturing a color chart for color matching including patches by a first image capturing apparatus serving as a reference;
obtaining a second captured image by capturing the color chart with a second image capturing apparatus serving as a correction target;
obtaining correction information for the color matching;
generating a third captured image by applying the correction information to the second captured image;
outputting color difference signals of the first captured image and color difference signals of the third captured image; and
generating first and second images, the first image being generated based on the color difference signals of the first captured image and first positional information indicating areas corresponding to the patches in the color chart of the first captured image by extracting the area indicated by the first positional information from the first captured image, and the second image being generated based on the color difference signals of the third captured image and second positional information indicating areas corresponding to the patches in the color chart a of the second captured image by extracting the area indicated by the second positional information from the third captured image.

18. The color adjustment apparatus according to claim 1, wherein the at least one processor further executes an instruction to switch, in accordance with a user operation, to one of the following modes:
a first mode for displaying the color difference signals of the first captured image and the color difference signals of the third captured image and
a second mode for displaying the first image and the second image.

* * * * *